May 12, 1953  E. W. KAMMER ET AL  2,638,335
BONDED WIRE STRAIN-GAUGE ACCELEROMETER
Filed March 1, 1950
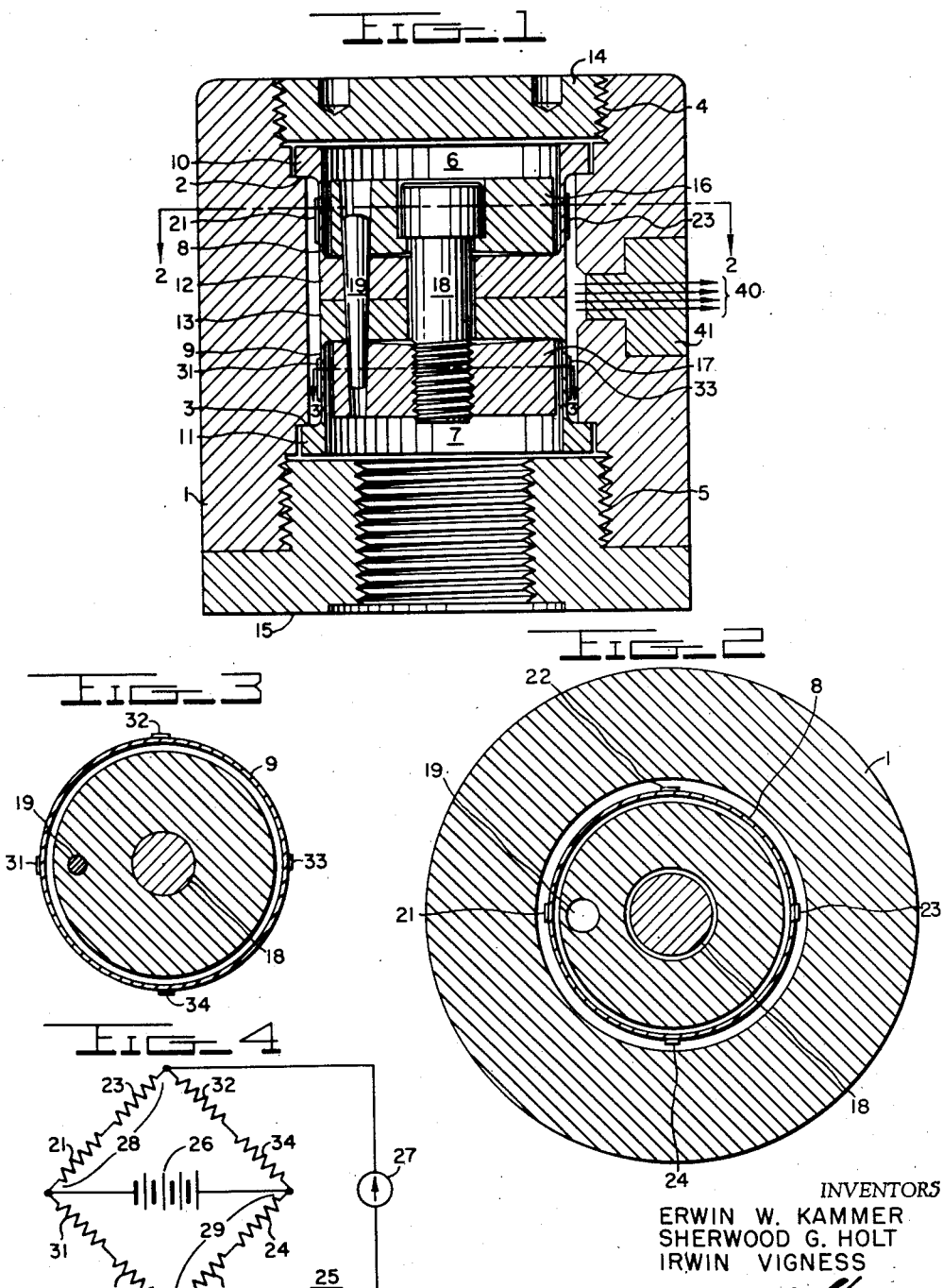
INVENTORS
ERWIN W. KAMMER
SHERWOOD G. HOLT
IRWIN VIGNESS
BY
ATTORNEY Patented May 12, 1953

2,638,335

UNITED STATES PATENT OFFICE 2,638,335

BONDED WIRE STRAIN-GAUGE ACCELEROMETER

Erwin W. Kammer, Alexandria, Va., Irwin Vigness, Washington, D. C., and Sherwood G. Holt, Ithaca, N. Y.

Application March 1, 1950, Serial No. 147,115

12 Claims. (Cl. 264—1)

(Granted under Title 35, U. S. Code (1952), sec. 266)

This invention relates to an acceleration measuring device or accelerometer and more particularly to an accelerometer utilizing a mechanically strainable means for sensing acceleration, and electrical resistance wire strain gage means bonded throughout their length to the strainable means for sensing strain, as a measure of acceleration.

One type of accelerometer well known in the prior art depends for its operation on the piezoelectric effect of an acceleration sensing element. Accelerometers of this type have certain disadvantages, for example the high impedance of the piezoelectric element, rendering it susceptible to electrical noise interference, to distortion if lengthy signal transmission cables are used, and to excessive loss of signal if additional shunting capacitance is introduced, etc. Also the piezoelectric element tends to lose its charge by leakage during periods of constant acceleration.

Another type of accelerometer known in the prior art employs fine wires acting as force transmitting members to support and restrain a mass which is subject to the acceleration to be measured. These wires are subject to strain by the force acting on the accelerated mass. The electrical resistance of the wires varies in proportion to the strain. When these wire strain gages are connected in an electric circuit suitable for measuring the varying resistance, an output is developed which is a measure of the acceleration forces on the restrained mass. Accelerometers of this type have the disadvantage of an inherently low resonant frequency when large acceleration forces are measured and relatively large output power is desired. Also to obtain accurate results the initial tension of the strain wires must be carefully regulated, and in measuring accelerations of very high frequency, some means of damping must be provided to prevent excessive amplitudes of strain variation in the wires. Another disadvantage of accelerometers of this type is that they are capable of accurately measuring accelerations over only a relatively narrow range.

An object of our invention, therefore, is to provide an accelerometer characterized in such a manner as to overcome the above disadvantages.

Another object of our invention is to provide an accelerometer having a mass which is supported by an element subject to mechanical strain proportional to the acceleration of the mass, and electric wire resistance strain sensitive gages bonded to the supporting element for measuring the acceleration of the mass.

Another object of our invention is to provide an accelerometer capable of measuring accurately accelerations over a wide range.

Another object is to provide an accelerometer having a low internal impedance.

Another object is to provide an accelerometer capable of providing output signals of relatively large electric power under varying load conditions.

Another object is to provide an accelerometer producing an output which, during constant acceleration of the mass, will be sustained indefinitely at a value proportional to the acceleration, and provide a method for obtaining velocity by time integration.

Another object is to provide an accelerometer having a high natural frequency, for measuring vibrations having frequencies up to 5000 cycles per second, and accelerations up to 5000 times the acceleration of gravity, for example.

Another object is to provide an accelerometer sensitive to accelerations only in the direction of one axis.

Another object is to provide an accelerometer constructed in accordance with the present invention having its strain gages arranged in electrical circuit relationship so that sensitivity to accelerations at right angles to the one sensitive axis will be reduced substantially to zero.

Other objects and features of the present invention will appear more fully hereinafter from the following detailed description considered in connection with the accompanying drawing which discloses one embodiment of the invention. It is expressly understood, however, that the drawing is designed for purposes of illustration only, and not as a definition of the limits of the invention, reference for the latter purpose being had to the appended claims.

In the drawing, wherein like reference characters refer to like elements in all the figures:

Fig. 1 is a vertical sectional view of the assembled accelerometer.

Fig. 2 is a horizontal sectional view, taken on line 2—2 of Fig. 1.

Fig. 3 is a horizontal sectional view taken on line 3—3 of Fig. 1.

Fig. 4 is a diagrammatic showing of an arrangement in a measuring circuit of the strain gages appearing in Fig. 1.

In a device constructed in accordance with the present invention, the accelerometer mass is supported and restrained by means which is subject to mechanical strain during acceleration of the mass, and strain sensitive electrical resistance wire gage means are bonded throughout their lengths to this supporting means. The gage means are connected in a particular and novel manner in resistance bridge circuit relation, for measuring the desired accelerations of the mass. This arrangement provides a practical sensitive element for a wide range accelerometer having a sufficiently low internal impedance to reduce cable effects and electrical interference to a negligible value and to provide for relatively large power outputs under varying load conditions.

As shown in Fig. 1, the accelerometer body 1 is a cylinder bored out to provide shoulders 2 and 3 and internally threaded end portions 4 and 5. The mechanically strainable means comprises cylindrical cups 6 and 7 having thin side walls 8 and 9 supported from shoulders 2 and 3 at flanges 10 and 11, respectively, coaxially within the body 1. Bottoms 12 and 13 of cups 6 and 7, respectively, are disposed in adjacent opposed relationship. The ends of body 1 are closed by threaded plugs 14 and 15.

Weights 16 and 17 are disposed in the bottoms of cups 6 and 7, respectively, by a fastening means such as threaded bolt 18 which passes through axially aligned holes in the weights and cup bottoms.

For reasons explained more fully hereinafter, cup side walls 8 and 9 are so dimensioned with respect to spaced apart shoulders 2 and 3, as to place the side walls in tension when the cup bottoms 12 and 13 are drawn firmly together by tightening of bolt 18.

Weight 16, cup bottom 12, cup bottom 13, and weight 17 are provided with aligned holes having a continuous taper for accommodating taper pin 19. This pin prevents relative rotation of the weights and cups in body 1.

The thin walls of the cups provide the spring or flexible mounting for the accelerometer mass, consisting of the weights 16 and 17, bottoms 12 and 13, bolt 18 and taper pin 19. It is desirable to make the cup walls of a material having a low modulus of elasticity, so that for a given stiffness the walls can be as thick as possible, thus simplifying construction and decreasing the likelihood of buckling or distortion. The displacements of the mass relative to the body of the instrument are very small, so that a material with high damping properties is desirable. A high yield stress is also desirable to permit an initial preload in the material without overstressing under high accelerations. One material, for example, which satisfies these requirements is duraluminum.

When the weights and cups are assembled, as explained hereinbefore, the cup walls 8 and 9 are placed in tension by tightening of the central bolt 18. This tension is designed to produce a strain in the walls, under conditions of no acceleration, corresponding to a point about half way up the linear portion of the stress-strain curve for the wall material. The maximum acceleration for which the instrument is intended does not reduce the tension in either cup wall to zero at maximum deflection of the accelerometer mass.

To convert the strain in the supporting cup walls, caused by accelerations of the accelerometer mass, into an electrical signal, four similar resistance wire strain gages are used with each cup. As will be seen from additional reference to Figs. 2 and 3, these strain sensitive wires 21, 22, 23, 24, and 31, 32, 33, 34 are bonded to the outside of the cup walls, parallel to the axis of the cups, disposed equidistant about the wall periphery and equidistant from the bottoms of their respective cups. One well known method of making such a bond is by cementing the gage wire to a piece of paper, and cementing the paper in turn to the member to be strained. The gages 21, 22, 23 and 24 on cup 2 are axially aligned with gages 31, 32, 33 and 34, respectively, on cup 3. Circuit connection wires 40 are brought out from the gages through plug 41 set in the side of body 1.

In Fig. 4, the gages 21, 22, 23, 24 and 31, 32, 33, 34 are shown schematically as their electrical resistance equivalents, connected in the well known form of a Wheatstone bridge 25 having a source of direct current power 26 and an output indicator 27. As may be seen from Fig. 4, any one arm of the bridge contains two resistances comprising the diametrically opposite gages of any one cup. Any such pair of gages, for example gages 21 and 23, is disposed in an arm 28 of the bridge diagonally opposite the arm 29 comprising the other pair of gages 22 and 24 of the same cup. The term "diagonally opposite" is used to mean that disposition in which one end of the series-connected gage resistances in one arm is connected to one side of the current source 26, and one end of the series-connected gage resistances in the other arm is connected to the opposite polarity side of the current source, with the other ends of the respective arms connected to opposite terminals of indicator 27. The particular manner of connecting the resistance wire strain gages described above is designed to provide advantageous features of operation of the accelerometer, as will be more fully set out below.

In operation of the device, when cup 6 is under increased tension, which means gages 21, 22, 23 and 24 all increase in resistance, the tension in cup 7 is decreased, and gages 31, 32, 33 and 34 decrease in resistance, and vice versa. The connections as described above in the bridge circuit shown in Fig. 4 are such as to produce maximum unbalance in the bridge for this condition. A temperature increase tends to affect all gages equal, and if all the gages have the same temperature coefficient of resistance, the gages of each cup will increase in resistance equally, or decrease if the temperature decreases. This type of resistance change will have practically no effect upon the bridge balance, providing the gages are sufficiently alike.

Another feature of this arrangement of gages in the bridge circuit is to reduce the effect of undesired modes of vibration of the cups and mass system, and to reduce the sensitivity of the unit to accelerations at right angles to the longitudinal axis of body 1. Consider for example the effect of a transverse displacement to the left of the cups and mass system in Fig. 1. By analogy to a beam restrained at its ends, and deflected transversely to its axis, thereby causing a stress in tension throughout its length, it will be apparent that the effect of such a displacement will be to put both cup walls in tension about their complete circumference. This will produce an equal increase in resistance in gages 21 and 31, 22 and 32, etc., respectively. In accordance with the well known manner of operation of the bridge circuit, such balanced changes in resistance will not appear at the output indicator 27.

Considering as a further example the effect of a rotative displacement of the mass system clockwise about an axis through its center parallel to a line between gages 22 and 24, it will be seen that gages 31 and 23 are subjected to an increased tensile stress, while gages 21 and 33 are subject to a decrease tensile stress. Thus in the bridge circuit of Fig. 4 it will be seen that in any one arm of the bridge, an increase in resistance of one resistor, 31 for example, will be balanced by a decrease in resistance of the other resistor, and the value of the total resistance of that arm will remain unchanged by rotative displacement of the mass system. Therefore no change in output will appear at indicator 27.

Thus it may be seen that this instrument is particularly sensitive to accelerations only in the direction of the longitudinal axis of body 1, in which case the uniform increases in resistance of the strain gages of one cup will coact in diagonally opposite arms of the bridge with uniform decreases in resistance of the strain gages of the other cup, disposed in adjacent diagonally opposite arms of the bridge, to provide a maximum differential in voltage at the output terminals of the bridge.

It should also be apparent, from a consideration of the low internal impedance of the bridge circuit, that the accelerometer herein disclosed is for a given acceleration essentially a constant voltage generator, and is therefore capable of providing a power output to various size load impedances which is large relative to the output obtainable from the high internal impedance piezoelectric type of instrument.

An accelerometer has been constructed in accordance with the present invention which is capable of measuring vibrations having frequencies up to 5000 cycles per second, and accelerations up to 5000 times the acceleration of gravity.

Although only one embodiment of the present invention has been disclosed and described herein, it is expressly understood that various changes and substitutions may be made therein without departing from the spirit of the invention as well understood by those skilled in the art. Reference therefore should be had to the appended claims for a definition of the limits of the invention.

The invention described herein may be manufactured and used by or for the Government of the United States of America for governmental purposes without the payment of any royalties thereon or therefor.

What is claimed is:

1. An accelerometer comprising a mass, a strainable metallic means supporting said mass, strain sensing means comprising a resistance wire bonded to said strainable means with an orientation parallel to the direction of stress produced on said strainable means by said mass, said strain sensing means adapted to be connected to means for measuring acceleration of said mass as a function of resistance variations of said strain sensing means.

2. In an accelerometer, a mass, a thin-walled hollow cylindrical member restraining said mass from displacement due to acceleration in a direction axially of said cylindrical member, electric wire resistance strain gages disposed about the surface of said cylindrical member, means bonding said strain gages to the surface of said cylindrical supporting member with an orientation parallel to the axis of said cylinder, whereby the strain of said gages varies responsive to axial accelerations of said mass and the electrical resistance of said gages varies responsive to said strain, said strain gages adapted to be connected in electric circuit relationship to measure the variation in electrical resistance of said gages.

3. An acceleration measuring device comprising, in combination, mass means, body means including spaced apart supporting means thereon, a plurality of thin-walled strain responsive means, means securing said mass means intermediate said strain responsive means, said mass means suspended intermediate said spaced apart supporting means by said strain responsive means, said supporting means spaced apart on said body means a distance sufficient to tension said strain responsive means an amount equal to approximately one half of the yield stress of said strain responsive means, electric wire resistance strain gages, means bonding said strain gages throughout their effective length to said strain responsive means parallel to the direction of strain in said strain responsive means, said strain gages adapted to be connected to electric circuit means for indicating a change in strain of said thin-walled means responsive to an acceleration of said mass means.

4. Means for measuring the acceleration of a mass supported between two axially spaced apart coaxial hollow cylindrical members comprising a plurality of electrical resistance wire strain gages, means bonding said strain gages to the outsides of said cylindrical members with an orientation parallel to the axis of said cylinder whereby the axial strain of said gages varies responsive to axial accelerations of said mass and the electrical resistance of said strain gages varies responsive to said axial strain, said strain gages adapted to be connected in electric circuit relation to measure the variation in electrical resistance of said gages.

5. Means measuring the changes in axial strain of two axially spaced apart coaxial hollow cylinders supporting a mass therebetween, responsive to axial accelerations of said mass, said means comprising a plurality of electrical resistance wire strain gages, means bonding to the side wall of each of said cylinders an equal number of said gages in equally spaced relation about a circumference of each of said cylinders with an orientation parallel to the axis of said cylinders, said gages of one cylinder axially aligned with said gages of the other cylinder.

6. An acceleration measuring device comprising, in combination, mass means, body means including spaced apart supporting means thereon, a plurality of thin-walled strain responsive means, said thin-walled cylindrical means characterized by a low modulus of elasticity, high damping properties, and a high yield stress, means securing said mass means intermediate said strain responsive means, said mass means suspended intermediate said spaced apart supporting means by said strain responsive means, said supporting means spaced apart on said body means a distance sufficient to tension said strain responsive means an amount equal to approximately one half of the yield stress of said strain responsive means, electric wire resistance strain gages, means bonding said strain gages throughout their effective length to said strain responsive means parallel to the direction of strain in said strain responsive means, said strain gages adapted to be connected to electric circuit means for indicating a change in strain of said thin-walled means responsive to an acceleration of said mass means.

7. An acceleration measuring device comprising a hollow body including a plurality of spaced mounting means on the inside thereof, thin-walled cup members supported at their open ends from said mounting means with the closed ends of said cup members in opposed adjacent relationship, a plurality of equal weight means, means securing said weight means in the bottom of each of said cup members, means drawing the bottoms of the cup members together for tensioning said thin walls between said mounting means an amount corresponding to approximately one half the yield stress of said thin walls, a plurality of electrical resistance strain gages disposed parallel to the axis of said cup members, means bonding said plurality of strain gages throughout their length to said thin walls, said strain gages adapted to be connected to electric circuit means for indicating changes in strain of said thin walls responsive to accelerations of said weight means.

8. Means for measuring with maximum sensitivity the change in axial strain of two axially spaced apart coaxial hollow cylindrical cup members supporting a mass therebetween in response to accelerations of said mass in a direction axial of said cylinders and substantially non-responsive to accelerations of said mass in other directions, comprising four electric wire resistance strain gages spaced equally about the periphery of each said cylinder parallel to the axis of said cylinders and equally spaced from the adjacent ends of said cylinders with the four gages of one cylinder axially aligned with the four gages of the other cylinder, means bonding said eight wire resistance strain gages throughout their length to the surfaces of said cylinders, means connecting said eight wire resistance strain gages in resistance bridge circuit relationship with each arm of said bridge comprised of the diametrically opposed gages of any one cylinder connected in series and with the diagonally opposite arms of said bridge comprised of the gages of any one cylinder.

9. An acceleration measuring device comprising a hollow cylindrical body including a pair of spaced circumferential mounting shoulders on the inside wall thereof, a pair of cylindrical thin-walled cups including flanges around the open ends thereof, said cups supported by said flanges from said shoulders in axially aligned relation with said body, the bottoms of said cups supported in adjacent opposed relation, said bottoms provided with axially aligned coincident holes, a weight secured within each cup by a bolt passing through said holes and said weights, said cup supporting shoulders spaced apart longitudinally of said body a distance sufficient to stress said cup side walls in tension an amount corresponding to one half the yield stress of said side walls, four similar electrical wire resistance strain gages bonded to the side walls of each of said cups parallel to the axis of said cylindrical body in equally spaced relation about the circumference of said cup walls and equidistant from said cup bottoms with the strain gages of one cup secured in axial alignment with the strain gages of the other cup, means connecting said strain gages in electrical bridge circuit relationship with each arm of said bridge comprising the diametrically opposite strain gages of any one cup and the diagonally opposite arms of said bridge comprising all of the gages of any one cup, whereby said bridge circuit measures with maximum sensitivity changes in electrical resistance of said gages responsive to longitudinal accelerations of said masses within said body and is substantially insensitive to change in electrical resistance of said gages responsive to transverse and rotative accelerations of said weights within said body.

10. An acceleration measuring device comprising a hollow cylindrical body including a pair of spaced circumferential mounting shoulders on the inside wall thereof, a pair of cylindrical thin-walled cups including flanges around the open ends thereof, said cups supported by said flanges from said shoulders in axially aligned relation with said body, the bottoms of said cups supported in adjacent opposed relation, said bottoms provided with axially aligned coincident holes, a weight secured within each cup by a bolt passing through said holes and said weights, said bolt drawing said cup bottoms toward each other an amount sufficient to stress said cup side walls in tension by an amount corresponding to one half the yield stress of said side walls, four similar electrical wire resistance strain gages bonded to the side walls of each of said cups parallel to the axis of said cylindrical body in equally spaced relation about the circumference of said cup walls and equidistant from said cup bottoms with the strain gages of one cup secured in axial alignment with the strain gages of the other cup, said strain gages adapted to be connected in electrical circuit relationship for measuring changes in electrical resistance of said gages responsive to longitudinal accelerations of said weights within said body.

11. An acceleration measuring device comprising a hollow cylindrical body including a pair of spaced circumferential mounting shoulders on the inside wall thereof, a pair of cylindrical thin-walled cups including flanges around the open ends thereof, said thin cup walls characterized by a low modulus of elasticity, high damping properties, and a high yield stress, said cups supported by said flanges from said shoulders in axially aligned relation with said body, the bottoms of said cups supported in adjacent opposed relation, said bottoms provided with axially aligned coincident holes, a weight secured within each cup by a bolt passing through said holes and said weight, said bolt drawing said cup bottoms toward each other an amount sufficient to stress said cup side walls in tension by an amount corresponding to one half the yield stress of said side walls, four similar electrical wire resistance strain gages bonded to the side walls of each of said cups parallel to the axis of said cylindrical body in equally spaced relation about the circumference of said cup walls and equidistant from said cup bottoms with the strain gages of one cup secured in axial alignment with the strain gages of the other cup, said strain gages adapted to be connected in electrical circuit relationship for measuring changes in electrical resistance of said gages responsive to longitudinal accelerations of said weights within said body.

12. An acceleration measuring device comprising a hollow cylindrical body including a pair of spaced circumferential mounting shoulders on the inside wall thereof, a pair of cylindrical thin-walled cups including flanges around the open ends thereof, said cups supported by said flanges from said shoulders in axially aligned relation with said body, the bottoms of said cups supported in adjacent opposed relation, said bottoms provided with axially aligned coincident holes, a weight secured within each cup by a bolt passing through said holes and said weights, said bolt drawing said cup bottoms toward each other an amount sufficient to stress said cup side walls in tension by an amount corresponding to one half the yield stress of said side walls, four similar electric wire resistance strain gages spaced equally about the periphery of each of said cups parallel to the axis of said cups and equally spaced from the adjacent ends of said cups with the four gages of one cup axially aligned with the four gages of the other cup, means bonding said eight wire resistance strain gages throughout their length to the surfaces of said cups and means connecting said eight wire resistance strain gages in resistance bridge circuit relationship with each arm of said bridge comprised of the diametrically opposed gages of any one cup connected in series and with the diagonally opposite arms of said bridge comprised of the gages of any one cup.

ERWIN W. KAMMER.
IRWIN VIGNESS.
SHERWOOD G. HOLT.

References Cited in the file of this patent

UNITED STATES PATENTS

| Number | Name | Date |
|---|---|---|
| 2,435,231 | McPherson | Feb. 3, 1948 |
| 2,477,026 | Wenk et al. | July 26, 1949 |